(12) United States Patent
Zucker et al.

(10) Patent No.: US 11,587,149 B2
(45) Date of Patent: *Feb. 21, 2023

(54) ASSOCIATING SHOPPERS TOGETHER

(71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/469,202

(22) Filed: Sep. 8, 2021

(65) Prior Publication Data

US 2021/0406990 A1 Dec. 30, 2021

Related U.S. Application Data

(63) Continuation of application No. 16/174,754, filed on Oct. 30, 2018, now Pat. No. 11,176,597.

(51) Int. Cl.
*G06Q 30/06* (2012.01)
*G06Q 30/0601* (2023.01)
(Continued)

(52) U.S. Cl.
CPC ..... *G06Q 30/0635* (2013.01); *G06K 7/10297* (2013.01); *G06Q 20/12* (2013.01); *G06Q 20/34* (2013.01); *G06Q 20/40145* (2013.01); *G06V 20/10* (2022.01); *G06V 20/52* (2022.01); *H04W 4/021* (2013.01); *H04W 4/029* (2018.02)

(58) Field of Classification Search
CPC .... G06Q 30/0635; G06Q 20/12; G06Q 20/34; G06Q 20/40145; G06Q 20/20; G06K 7/10297; G06K 9/6276; G06V 20/10; G06V 20/52; H04W 4/021; H04W 4/029; G07G 1/0036; H04N 7/181
See application file for complete search history.

(56) References Cited

U.S. PATENT DOCUMENTS 6,659,344 B2 * 12/2003 Otto .......................... G07F 7/02
705/28
8,073,197 B2 * 12/2011 Xu ........................... G06T 7/277
348/169

(Continued)

*Primary Examiner* — Jefferey F Harold
*Assistant Examiner* — Timothy R Newlin
(74) *Attorney, Agent, or Firm* — Schwegman, Lundberg & Woessner (57) ABSTRACT

A store having an automated checkout can automatically associate multiple shoppers with a single purchase. For example, a mother and her children can walk independently through the store and select items. Upon checkout, the items selected by the mother and children can all be charged to the mother's credit card in a single purchase. The system and method discussed herein can capture images of multiple shoppers from one or more video streams of a store area, can associate the multiple shoppers with one another from the captured images when the multiple shoppers appear together in a check-in area of the store, can track the movement of the multiple shoppers within the store from the captured images, can track items selected by the multiple shoppers from the captured images, and can initiate a transaction that charges the selected items to an account associated with one of the multiple shoppers.

19 Claims, 4 Drawing Sheets

(51) Int. Cl.
*G06Q 20/34* (2012.01)
*G06Q 20/12* (2012.01)
*G06K 7/10* (2006.01)
*H04W 4/021* (2018.01)
*H04W 4/029* (2018.01)
*G06Q 20/40* (2012.01)
*G06V 20/10* (2022.01)
*G06V 20/52* (2022.01)

(56) References Cited

U.S. PATENT DOCUMENTS

| | | | | |
|---|---|---|---|---|
| 8,325,982 | B1* | 12/2012 | Moon | G06V 20/52 348/169 |
| 10,108,850 | B1* | 10/2018 | Das | G06V 10/82 |
| 10,373,322 | B1* | 8/2019 | Buibas | G06T 7/246 |
| 2003/0107649 | A1* | 6/2003 | Flickner | G06T 7/292 348/169 |
| 2003/0198368 | A1* | 10/2003 | Kee | G06V 40/16 382/117 |
| 2007/0196001 | A1* | 8/2007 | Yanagawa | G06V 40/172 382/118 |
| 2008/0052312 | A1* | 2/2008 | Tang | G06F 16/583 707/E17.02 |
| 2008/0123907 | A1* | 5/2008 | Eura | G06V 40/172 382/118 |
| 2008/0130962 | A1* | 6/2008 | Lee | G06V 40/169 382/118 |
| 2008/0166045 | A1* | 7/2008 | Xu | G06T 7/215 382/170 |
| 2008/0273766 | A1* | 11/2008 | Kim | G06V 40/173 382/118 |
| 2010/0098301 | A1* | 4/2010 | Zhou | G06V 10/507 348/46 |
| 2012/0185355 | A1* | 7/2012 | Kilroy | G06Q 30/0633 705/26.8 |
| 2015/0010204 | A1* | 1/2015 | Iwai | G06V 20/52 382/103 |
| 2015/0039458 | A1* | 2/2015 | Reid | A61B 5/117 705/26.1 |
| 2015/0154449 | A1* | 6/2015 | Ito | G06V 40/107 382/103 |
| 2015/0324635 | A1* | 11/2015 | Tanaka | G06Q 40/00 340/5.91 |
| 2016/0110703 | A1* | 4/2016 | Herring | G07G 1/0045 705/23 |
| 2016/0110793 | A1* | 4/2016 | Herring | G06Q 30/0235 705/26.64 |
| 2016/0132718 | A1* | 5/2016 | Park | G06V 10/243 382/118 |
| 2016/0132720 | A1* | 5/2016 | Klare | G06V 10/42 382/118 |
| 2017/0068969 | A1* | 3/2017 | Arai | G06T 7/20 |
| 2017/0091850 | A1* | 3/2017 | Alvarez | H04B 5/0062 |
| 2017/0132690 | A1* | 5/2017 | Todd | G06Q 20/102 |
| 2017/0228804 | A1* | 8/2017 | Soni | G06Q 30/0641 |
| 2018/0374101 | A1* | 12/2018 | Coelho | G06Q 20/20 |
| 2019/0073520 | A1* | 3/2019 | Ayyar | G06F 16/784 |

\* cited by examiner

ASSOCIATING SHOPPERS TOGETHER

CROSS-REFERENCE TO RELATED APPLICATION

This application is a continuation of U.S. patent application Ser. No. 16/174,754, filed Oct. 30, 2018, which application and publication are incorporated herein by reference in their entirety.

FIELD OF THE DISCLOSURE

The present disclosure relates generally to automatically tracking shoppers in a store having an automated checkout.

BACKGROUND OF THE DISCLOSURE

In a store having an automated checkout, a single purchase may be associated with multiple shoppers. For example, a mother and her two children may produce a single order, rather than three separate orders, at the store checkout. For a store having an automated checkout, it would be beneficial to automatically associate the multiple shoppers with the single purchase.

Corresponding reference characters indicate corresponding parts throughout the several views. Elements in the drawings are not necessarily drawn to scale. The configurations shown in the drawings are merely examples, and should not be construed as limiting the scope of the inventive subject matter in any manner.

DETAILED DESCRIPTION

A store having video surveillance and an automated (e.g., frictionless) checkout can automatically associate multiple shoppers with a single purchase.

The system and method discussed herein can capture images of multiple shoppers from one or more video streams of a store area, can automatically associate the multiple shoppers with one another from the captured images when the multiple shoppers appear together in a check-in area of the store, can track the movement of the multiple shoppers within the store from the captured images, can track items selected by the multiple shoppers from the captured images, and can initiate a transaction that charges the selected items to an account associated with one of the multiple shoppers.

For example, a mother and her children can walk independently through a store and select items. At an automated (e.g., frictionless) checkout of the store, the items selected by the mother and children can all be charged to the mother's credit card in a single purchase.

Performing this automatic association of multiple shoppers with one another can leverage use of a store's tracking system, and can simplify checkout by not requiring explicit input from the multiple shoppers to determine if their selected items are to be combined into a single purchase.

The tracking system is first described below, after which specific aspects of the tracking system are described that allow the tracking system to automatically associate multiple shoppers together for a single purchase.

In the store's tracking system, one or more cameras can monitor a shopping area of the store. Each video frame captured by the camera or cameras can be sent to a convolutional neural network deep learning model that does single shot object detection for people. In some examples, the rate at which frames are sent may not correspond to the frame rate of the video camera. In some examples, the rate at which frames are sent can be 15 or fewer frames per second, 10 or fewer frames per second, 5 or fewer frames per second, one frame per second, or another suitable value. The object detection can return back all people that are present in the image. The images of the people can then be cropped and sent to an alternate convolutional neural network that can compute the graham matrix to figure out the style of the person's clothes. The system can use techniques like optical flow, kalman filters, and deep KNN to track the individuals and log their geographical location in the store. Analytics can be easily computed on this data to answer questions like: where are the current store employees, what areas of the store need more store clerks, where do shoppers spend most of their time, what areas of the store are most popular, what areas of the store are least popular, which store employees are not where they are supposed to be, which store employees are not present, how many total shoppers are in the store, and so forth. The system can perform all of these analytics and log them in real time.

The system can also identify store items that are handled by the shoppers. When a shopper handles an item, the system can add the item to a virtual cart, which includes items to be purchased by the shopper. When the shopper returns an item to a shelf, the item can be removed from the virtual cart. Keeping track of items in this manner can allow shoppers to store their items to be purchased in a cart without having to ensure that the items are visible in the cart, and can allow shoppers to check out without having to remove the items from the cart, such as by placing them on a counter or conveyor to be scanned.

One technique that has been developed to perform tracking is known as "deep SORT". Deep SORT improves upon a known "SORT" technique by incorporating appearance information through a pre-trained association metric, which allows deep SORT to perform tracking through longer periods of occlusion.

The system and method discussed herein can capture images from one or more video streams of a store area, and can use deep learning to track movement of the people within the store. The tracked movement can provide information that is useful to operators of the store, such as where shoppers and store employees are, what items have been selected or handled by shoppers, how long the shoppers and/or employees have been in certain areas of the store, which areas of the store need more employees, where most shoppers are concentrated within the store, which areas of the store are popular, and so forth. The system and method can provide information for checking out a shopper, including which items have been selected for purchase by the shopper. The system and method can also log movement information, for downstream use.

As an off-the-shelf system, deep SORT is found to be excessively complicated and ill suited for the task of tracking employees and shoppers in a store. The system and method discussed herein include modifications to the deep SORT technique, which result in a technique that is well suited to the task of tracking shoppers, and the items to be purchased, in a store.

When a group of shoppers, such as a mother and her children, enter a store, the group of shoppers can check in at a designated check-in location in the store. One particular shopper in the group of shoppers can check in at the designated check-in location. The particular shopper can identify himself or herself at the designated check-in location, such as by scanning an optical identifier (e.g., a bar code or a QR code printed on a card or displayed on a screen of a mobile device), scanning a radiofrequency identifier (such as a card that includes a radiofrequency identification tag), scanning a credit card or driver's license, scanning a biometric identifier, such as a fingerprint or a retina, or other suitable identification. Once the store's identification system has obtained the shopper's identity, the system can link the identity to a payment method associated with the identity, such as a credit card number, a bank account number, an electronic payment identifier (such as a PayPal account email address), or others. If the system does not have a payment method already associated with the shopper's identity, the check-in system can prompt the shopper to enter a payment method.

While the group of shoppers is located at the check-in location in the store, the store's tracking system can capture one or more images of the shoppers, and can assign a common identifier to each shopper in the group of shoppers. When the tracking system recognizes the shoppers in subsequent images from the video stream, the tracking system can associate store items handled or selected by any of the shoppers in the group with the common identifier, so that all the items may be purchased in a single transaction at checkout.

In a specific example, a group of shoppers can enter a designated check-in area of a store. A video processing system can capture images of group of shoppers while the shoppers are in the check-in area, and, based on proximity, decide that the shoppers should be grouped together. The system can then assign the shoppers in the group a unique identifier. The system can form cropped images of the bodies of the identified shoppers in the group, and send the cropped images to a deep-learning autoencoder. The autoencoder can return a 128-dimensional feature vector that is stored in a K-Nearest Neighbors database. As members of the group of shoppers pick up and put down items around the store area, the system can send image crops of their bodies are sent to the autoencoder, which can return a feature vector that is queried against the K-Nearest Neighbors database. The system can search for the identifier value of the nearest feature vector based on the euclidean distance metric, which can be the identifier for the group.

In some examples, the system can leverage the tracking algorithm to track shoppers, and groups of shoppers, throughout the store. To link a group of shoppers to a common cart, the full group can enter the check-in area at the same time. The system can detect each member of the group, extract each person's feature vector, and store the feature vectors in a suitable lookup table. The system can keep note of the shopper identifiers who were in the check-in area together and map them to the same cart identifier.

Figure 1:
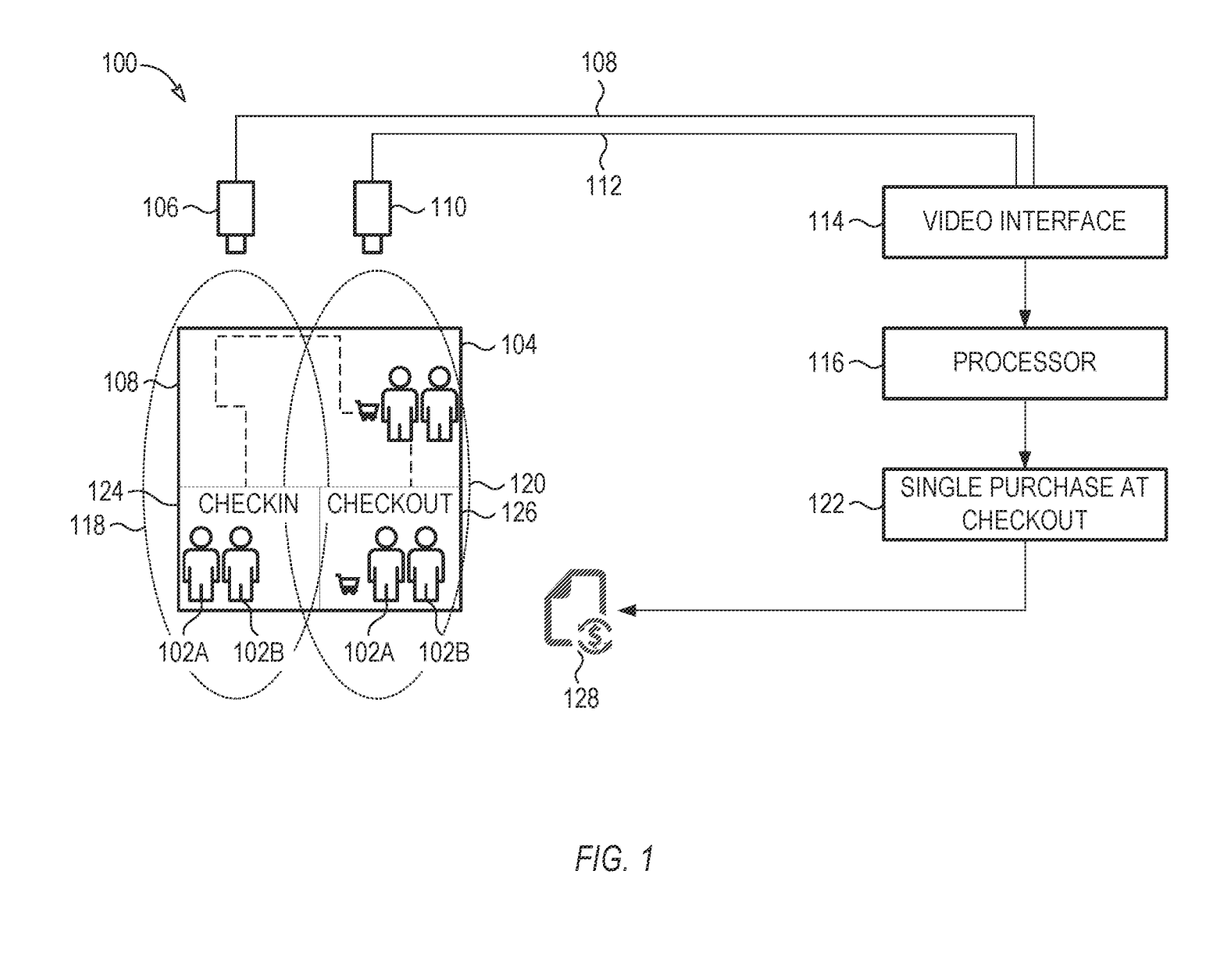
FIG. 1 shows an example of a video surveillance system that can track the movement of people within a confined area, such as a store, in accordance with some examples.

FIG. 1 shows an example of a video surveillance system 100 that can track the movement of people 102A-B within a confined area 104, such as a store, in accordance with some examples. The configuration of FIG. 1 is but one example; other suitable configurations can also be used.

A video camera 106 can be positioned to capture a video stream 108 of a confined area 104, such as the shopping area of a store. In some examples, an optional second video camera 110 can be positioned to capture an optional second video stream 112 of at least a portion of the confined area 104. In some examples, at least one of the video cameras 106, 110 can capture at least a portion of a designated check-in area 124 of the store, and a designated check-out area 126 of the store. In some examples, the fields of view 118, 120 of the cameras can overlap in at least a portion of the confined area 104. In other examples, the fields of view may not overlap. In some examples, the video streams from the cameras can be processed downstream in a manner such that the cameras need not be explicitly aligned or registered to each other, such as by providing spatial (x, y, z) coordinates of the cameras. Eliminating the alignment of the cameras to each other is a benefit of the manner in which the video streams are processed. In some examples, there can be more than two cameras, each producing a corresponding video stream of at least a portion of the confined area 104.

A video interface 114 can receive the video stream 108, the optional second video stream 112, and any optional additional streams from optional additional cameras. In some examples, the video interface 114 can be a stand-alone piece of hardware, coupled to additional processors and networks as needed. In other examples, the video interface can include one or more dedicated cards in a computer or server. In still other examples, the video interface can be realized entirely in software and coupled to the processor, discussed below.

A processor 116 can be coupled to the video interface 114. The processor 116 can include one or more processors in a machine running locally (e.g., in the store), and/or one or more processors in a server at a remote location and connected to a server in the store through suitable network connections. The processor 116 can execute computing instructions to perform data processing activities. The data processing activities can include operations that pertain to processing of the video stream 108, the optional second video stream 112, and any optional additional streams from optional additional cameras. Such operations are explained in the context of FIG. 2.

In some examples the processor 116 can automatically generate a single purchase 122 at the checkout 126, for items flagged for purchase by shoppers in the group of shoppers 102A-B. In some examples, upon completion of the single purchase 122, the processor can optionally generate a paper receipt 128 for the shoppers 102A-B or send an electronic receipt 128 to the shopper whose credit card was charged. In some examples, the system can specify that two or more shoppers are splitting the cost of the purchase, optionally splitting evenly, and can generate the suitable number of purchases to respective accounts at checkout. This is but one example of instructions; other suitable instructions can also be used.

Figure 2:
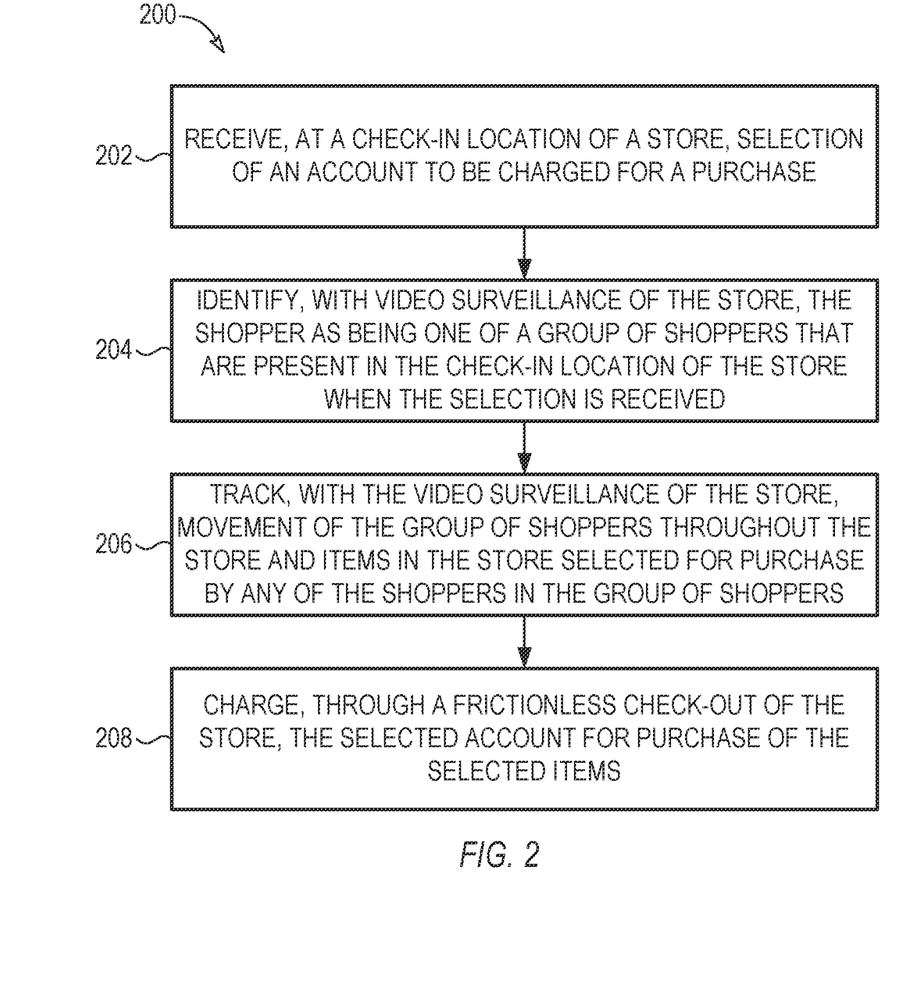
FIG. 2 shows a flowchart of an example of a method for conducting a retail transaction for a store that includes a video surveillance system and frictionless checkout, in accordance with some examples.

FIG. 2 shows a flowchart of an example of a method 200 for conducting a retail transaction for a store that includes a video surveillance system and frictionless checkout, in accordance with some examples. The method 200 of FIG. 2 can be executed by the system 100 of FIG. 1, or any other suitable system. The method 200 of FIG. 2 is but one example of a method for conducting a retail transaction for a store that includes a video surveillance system and frictionless checkout; other suitable methods can also be used.

As explained above, the processor coupled to the video interface can execute computing instructions to perform data processing activities. The data processing activities can include the operations shown in FIG. 2 and discussed below.

At operation 202, at a check-in location of a store, a selection can be received of an account to be charged for a purchase. The account can be associated with a shopper. In some examples, receiving the selection of the account can include: receiving input of data corresponding to a credit card number from the shopper. In some examples, receiving the data corresponding to the credit card number can include: receiving a credit card swipe. In some examples, receiving the selection of the account can include: reading a radiofrequency identification tag that corresponds to the shopper; and retrieving, from a server, a stored credit number that corresponds to the shopper. In some examples, receiving the selection of the account can include: scanning a visual code, such as a QR code printed on a card or displayed on a screen, that corresponds to the shopper; and retrieving, from a server, a stored credit number that corresponds to the shopper. In some examples, receiving the selection of the account can include: scanning a biometric indicator, such as a fingerprint scan, a retina, or a facial scan, that corresponds to the shopper; and retrieving, from a server, a stored credit number that corresponds to the shopper.

At operation 204, video surveillance of the store can identify the shopper as being one of a group of shoppers that are present in the check-in location of the store when the selection is received. In some examples, identifying the shopper as being one of the group of shoppers can include: receiving at least one image from the video surveillance system, the at least one image including the check-in location of the store; and assigning a common cart identifier to each person identified in the at least one image, the common cart identifier identifying all the shoppers in the group. In some examples, identifying the shopper as being one of the group of shoppers can include: forming cropped images of bodies of the identified shoppers in the group; sending the cropped images to at least one processor configured to execute a deep-learning autoencoder; and storing, on a storage device coupled to the at least one processor, a multi-dimensional feature vector in a nearest-neighbors database.

At operation 206, the video surveillance of the store can track movement of the group of shoppers throughout the store. In addition, the video surveillance of the store can track items in the store selected for purchase by any of the shoppers in the group of shoppers. In some examples, the video surveillance can track the items in the store by tracking items that are handled by any of the group of shoppers. In some examples, tracking the items in the store selected for purchase by any of the shoppers in the group of shoppers can include: sensing, with the video surveillance of the store, that a first shopper, of the group of shoppers, has picked up a first item from a shelf or rack; and adding the first item to a virtual shopping cart. In some examples, tracking the items in the store selected for purchase by any of the shoppers in the group of shoppers can further include: sensing, with the video surveillance of the store, that the first shopper has returned the first item to the shelf or rack; and removing the first item from the virtual shopping cart. In some examples, tracking the items in the store selected for purchase can include: sensing, with the video surveillance of the store, that a first item has been picked up; sending, to the deep-learning autoencoder, a cropped image of the person who picked up the first item; retrieving, from the deep-learning autoencoder, a feature vector corresponding to the sent cropped image; calculating a Euclidean distance metric between the retrieved feature vector and feature vectors stored on the storage device; and identifying, from the stored feature vector having the shortest Euclidean distance to the retrieved feature vector, a first shopper as the person who picked up the first item.

At operation 208, a frictionless check-out of the store can charge the selected account for purchase of the selected items. In some examples, the shoppers can leave the purchasable items in a shopping cart, without having to place them on a conveyor for scanning. In some examples, the shoppers can wheel the shopping cart through a designated check-out area of the store, the video surveillance of the store can recognize the shoppers in the check-out area, can check to see which accounts are associated with the shoppers (in this case, the group of shoppers are all associated with a single account), and can charge the account for purchase of the items in the shopping cart (which have all been selected for purchase as the shoppers moved through the store area).

Figure 3:
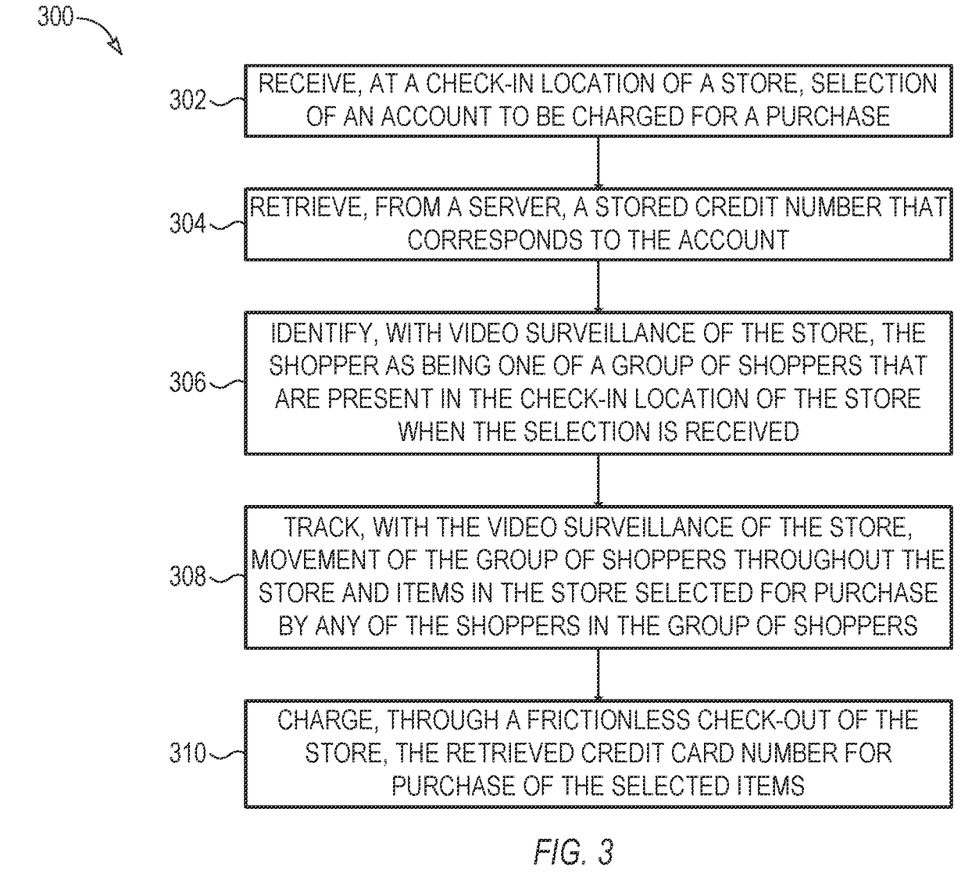
FIG. 3 shows a flowchart of an example of a method for conducting a retail transaction for a store that includes a video surveillance system and frictionless checkout, in accordance with some examples.

FIG. 3 shows a flowchart of an example of a method 300 for conducting a retail transaction for a store that includes a video surveillance system and frictionless checkout, in accordance with some examples. The method 300 of FIG. 3 can be executed by the system 100 of FIG. 1, or any other suitable system. The method 300 of FIG. 3 is but another example of a method for conducting a retail transaction for a store that includes a video surveillance system and frictionless checkout; other suitable methods can also be used. As explained above, the processor coupled to the video interface can execute computing instructions to perform data processing activities. The data processing activities can include the operations shown in FIG. 3 and discussed below.

At operation 302, at a check-in location of a store, a user interface can receive a selection of an account to be charged for a purchase. The user interface can be a kiosk or terminal in the check-in location of the store. The account, such as a credit card number, a bank routing and account number, or an electronic payment account, can be associated with a shopper.

At operation 304, a stored credit number that corresponds to the account can be retrieved from a server.

At operation 306, video surveillance of the store can identify the shopper as being one of a group of shoppers that are present in the check-in location of the store when the selection is received.

At operation 308, the video surveillance of the store can track movement of the group of shoppers throughout the store and items in the store selected for purchase by any of the shoppers in the group of shoppers.

At operation 310, through a frictionless check-out of the store, the retrieved credit card number can be charged for purchase of the selected items.

Figure 4:
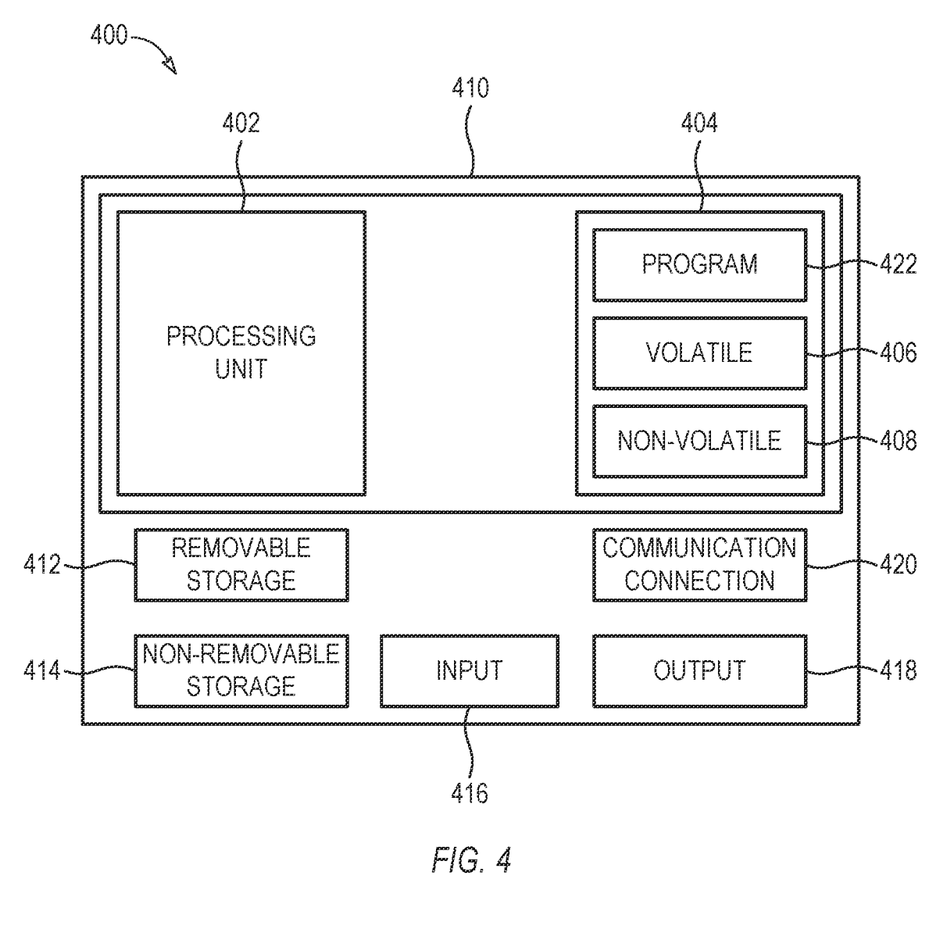
FIG. 4 shows a block diagram of an example of a controller, in accordance with some examples.

FIG. 4 shows a block diagram of an example of a controller 400, in accordance with some examples. The controller 400 can be part of a system that can track people in a confined area, such as a store. The example of FIG. 4 is but one configuration for a controller; other configurations can also be used.

In one example, multiple such controllers 400 are utilized in a distributed network to implement multiple components in a transaction based environment. An object-oriented, service-oriented, or other architecture may be used to implement such functions and communicate between the multiple controllers 400 and components.

One example of a controller 400, in the form of a computer 410, can include a processing unit 402, memory 404, removable storage 412, and non-removable storage 414. Memory 404 may include volatile memory 406 and non-volatile memory 408. Computer 410 may include, or have access to a computing environment that includes, a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 can include a video interface. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a non-transitory computer-readable medium. For example, a computer program 422 with instructions for the computer 410, according to the teachings of the present disclosure, may be included on a CD-ROM and loaded from the CD-ROM to a hard drive. The computer-readable instructions allow computer 410 to provide generic access controls in a COM based computer network system having multiple users and servers.

In the foregoing detailed description, the method and apparatus of the present disclosure have been described with reference to specific embodiments thereof. It will, however, be evident that various modifications and changes may be made thereto without departing from the broader spirit and scope of the present disclosure. The present specification and figures are accordingly to be regarded as illustrative rather than restrictive.

To further illustrate the device and related method disclosed herein, a non-limiting list of examples is provided below. Each of the following non-limiting examples can stand on its own, or can be combined in any permutation or combination with any one or more of the other examples.

In Example 1, a method can include: receiving, at a check-in location of a store, selection of an account to be charged for a purchase, the account being associated with a shopper; identifying, with video surveillance of the store, the shopper as being one of a group of shoppers that are present in the check-in location of the store when the selection is received; tracking, with the video surveillance of the store, movement of the group of shoppers throughout the store and items in the store selected for purchase by any of the shoppers in the group of shoppers; and charging, through a frictionless check-out of the store, the selected account for purchase of the selected items.

In Example 2, the method of Example 1 can optionally be configured such that the video surveillance tracks the items in the store by tracking items that are handled by any of the group of shoppers.

In Example 3, the method of any one of Examples 1-2 can optionally be configured such that tracking the items in the store selected for purchase by any of the shoppers in the group of shoppers comprises: sensing, with the video surveillance of the store, that a first shopper, of the group of shoppers, has picked up a first item from a shelf or rack; and adding the first item to a virtual shopping cart.

In Example 4, the method of any one of Examples 1-3 can optionally be configured such that tracking the items in the store selected for purchase by any of the shoppers in the group of shoppers further comprises: sensing, with the video surveillance of the store, that the first shopper has returned the first item to the shelf or rack; and removing the first item from the virtual shopping cart.

In Example 5, the method of any one of Examples 1-4 can optionally be configured such that receiving the selection of the account comprises: receiving input of data corresponding to a credit card number from the shopper.

In Example 6, the method of any one of Examples 1-5 can optionally be configured such that receiving the data corresponding to the credit card number comprises: receiving a credit card swipe.

In Example 7, the method of any one of Examples 1-6 can optionally be configured such that receiving the selection of the account comprises: reading a radiofrequency identification tag that corresponds to the shopper; and retrieving, from a server, a stored credit number that corresponds to the shopper.

In Example 8, the method of any one of Examples 1-7 can optionally be configured such that receiving the selection of the account comprises: scanning a visual code that corresponds to the shopper; and retrieving, from a server, a stored credit number that corresponds to the shopper.

In Example 9, the method of any one of Examples 1-8 can optionally be configured such that receiving the selection of the account comprises: scanning a biometric indicator that corresponds to the shopper; and retrieving, from a server, a stored credit number that corresponds to the shopper.

In Example 10, the method of any one of Examples 1-9 can optionally be configured such that identifying the shopper as being one of the group of shoppers comprises: receiving at least one image from the video surveillance system, the at least one image including the check-in location of the store; and assigning a common cart identifier to each person identified in the at least one image, the common cart identifier identifying all the shoppers in the group.

In Example 11, the method of any one of Examples 1-10 can optionally be configured such that identifying the shopper as being one of the group of shoppers comprises: forming cropped images of bodies of the identified shoppers in the group; sending the cropped images to at least one processor configured to execute a deep-learning autoencoder; and storing, on a storage device coupled to the at least one processor, a multi-dimensional feature vector in a nearest-neighbors database.

In Example 12, the method of any one of Examples 1-11 can optionally be configured such that tracking the items in the store selected for purchase comprises: sensing, with the video surveillance of the store, that a first item has been picked up; sending, to the deep-learning autoencoder, a cropped image of the person who picked up the first item; retrieving, from the deep-learning autoencoder, a feature vector corresponding to the sent cropped image; calculating a Euclidean distance metric between the retrieved feature vector and feature vectors stored on the storage device; and identifying, from the stored feature vector having the shortest Euclidean distance to the retrieved feature vector, a first shopper as the person who picked up the first item.

In Example 13, a system can include: at least one video camera positioned to capture at least one video stream of a store; a video interface configured to receive the at least one video stream; and a processor coupled to the video interface and configured to execute computing instructions to perform data processing activities, the data processing activities comprising: receiving, at a check-in location of the store, selection of an account to be charged for a purchase, the account being associated with a shopper; identifying, from the at least one video stream, the shopper as being one of a group of shoppers that are present in the check-in location of the store when the selection is received; tracking, from the at least one video stream, movement of the group of shoppers throughout the store and items in the store selected for purchase by any of the shoppers in the group of shoppers; and charging, through a frictionless check-out of the store, the selected account for purchase of the selected items.

In Example 14, the system of Example 13 can optionally be configured such that tracking the items in the store comprises tracking items that are handled by any of the group of shoppers.

In Example 15, the system of any one of Examples 13-14 can optionally be configured such that tracking the items in the store comprises: sensing, from the at least one video stream, that a first shopper, of the group of shoppers, has picked up a first item from a shelf or rack; and adding the first item to a virtual shopping cart.

In Example 16, the system of any one of Examples 13-15 can optionally be configured such that tracking the items in the store further comprises: sensing, from the at least one video stream, that the first shopper has returned the first item to the shelf or rack; and removing the first item from the virtual shopping cart.

In Example 17, the system of any one of Examples 13-16 can optionally be configured such that receiving the selection of the account comprises: receiving input of data corresponding to a credit card number from the shopper.

In Example 18, the system of any one of Examples 13-17 can optionally be configured such that identifying the shopper as being one of the group of shoppers comprises: receiving at least one image from the at least one video stream, the at least one image including the check-in location of the store; and assigning a common cart identifier to each person identified in the at least one image, the common cart identifier identifying all the shoppers in the group.

In Example 19, the system of any one of Examples 13-18 can optionally be configured such that identifying the shopper as being one of the group of shoppers comprises: forming cropped images of bodies of the identified shoppers in the group; sending the cropped images to a deep-learning autoencoder configured to execute on the processor; and storing, on a storage device coupled to the processor, a multi-dimensional feature vector in a nearest-neighbors database.

In Example 20, a method can include: receiving, at a check-in location of a store, selection of an account to be charged for a purchase, the account being associated with a shopper; retrieving, from a server, a stored credit number that corresponds to the account; identifying, with video surveillance of the store, the shopper as being one of a group of shoppers that are present in the check-in location of the store when the selection is received; tracking, with the video surveillance of the store, movement of the group of shoppers throughout the store and items in the store selected for purchase by any of the shoppers in the group of shoppers; and charging, through a frictionless check-out of the store, the retrieved credit card number for purchase of the selected items.

What is claimed is:

1. A method, comprising:
receiving, at a check-in location of a store, selection of first and second accounts account to be charged for a purchase purchases, the first and second accounts account being associated with respective first and second shoppers shopper;
identifying, with a video surveillance system of the store, the first and second shoppers shopper as being one of a group of shoppers that are present in the check-in location of the store when the selection is received;
assigning a unique personal identifier to each respective member of the group of shoppers, the personal identifier based on a feature vector of the first shopper who is a particular member of the group of shoppers to which the personal identifier is assigned, the feature vector being a multi-dimensional vector created from a first image including at least the first shopper by applying a deep-learning autoencoder;
assigning a common cart to the group of shoppers and associating the common cart identifier with all members of the group of shoppers;
tracking with the video surveillance system of the store, movement of each member of the group of shoppers throughout the store and items in the store selected for purchase by any of the shoppers in the group of shoppers, wherein the tracking includes sensing when the first or second shopper picks up a particular item in the store, wherein the sensing is made by sending a second image to the deep-learning autoencoder, retrieving a second feature vector from the second image, and comparing the second feature vector with the feature vector, and wherein the second image includes at least one of the first and second shopper;
specifying that a cost of the purchase of the selected items is to be split between the first shopper and the second shopper;
charging, through a frictionless check-out of the store, the selected account first and second accounts for respective first and second portions of the cost of the purchase to be split between the first and second shoppers for the purchase of the selected items; and
charging, through the frictionless check-out of the store, the second account for a second portion of the cost of the purchase to be split between the first shopper and the second shopper for the purchase of the selected items.

2. The method of claim 1, wherein the video surveillance system tracks the items in the store by tracking items that are handled by any of the group of shoppers.

3. The method of claim 2, wherein tracking the items in the store selected for purchase by any of the shoppers in the group of shoppers comprises:
adding the particular item to a virtual shopping cart.

4. The method of claim 3, wherein tracking the items in the store selected for purchase by any of the shoppers in the group of shoppers further comprises:
sensing, with the video surveillance system of the store, that the first shopper has returned the particular item to the shelf or rack; and removing the particular item from the virtual shopping cart.

5. The method of claim 1, wherein receiving the selection of the account comprises:
receiving input of data corresponding to a credit card number from the shopper.

6. The method of claim 5, wherein receiving the data corresponding to the credit card number comprises:
receiving a credit card input.

7. The method of claim 1, wherein receiving the selection of the account comprises:
receiving a radiofrequency identifier that corresponds in stored data to the shopper; and
invoking a charging process that charges a purchase to a bankcard account represented in and associated with the shopper in stored data.

8. The method of claim 1, wherein receiving the selection of the account comprises:
scanning a visual code that corresponds in stored data to the shopper; and
invoking a charging process that charges a purchase to a bankcard account represented in and associated with the shopper in stored data.

9. The method of claim 1, wherein receiving the selection of the account comprises:
scanning a biometric indicator that corresponds in stored data to the shopper; and
invoking a charging process that charges a purchase to a bankcard account represented in and associated with the shopper in stored data.

10. The method of claim 1, wherein identifying the shopper as being one of the group of shoppers comprises:
receiving at least one image from the video surveillance system, the at least one image including the check-in location of the store.

11. The method of claim 1, wherein identifying a shopper as being one of the group of shoppers comprises:
forming cropped images of bodies of identified shoppers in the group of shoppers;
sending the cropped images to at least one processor configured to execute the deep-learning autoencoder; and
storing, on a storage device coupled to the at least one processor, the multi-dimensional feature vector in a nearest-neighbors database.

12. The method of claim 11, wherein tracking the items in the store selected for purchase comprises:
sensing, with the video surveillance of the store, that a particular item has been picked up;
sending, to the deep-learning autoencoder, a cropped image of the person who picked up the first item;
retrieving, from the deep-learning autoencoder, a feature vector corresponding to the sent cropped image;
calculating a Euclidean distance metric between the retrieved feature vector and feature vectors stored on the storage device; and
identifying, from the stored feature vector having the shortest Euclidean distance to the retrieved feature vector, a particular shopper as the person who picked up the first item.

13. A system, comprising:
at least one video camera positioned to capture at least one video stream of a store;
a video interface configured to receive the at least one video stream; and
a processor coupled to the video interface and configured to execute computing instructions to perform data processing activities, the data processing activities comprising:
receiving, at a check-in location of a store, selection of first and second accounts account to be charged for purchases, the first and second accounts being associated with respective first and second shoppers;
identifying, with a video surveillance system of the store, the first and second shoppers as being a group of shoppers that are present in the check-in location of the store when the selection is received;
assigning a unique personal identifier to each respective member of the group of shoppers, the personal identifier based on a feature vector of the first shopper who is a particular member of the group of shoppers to which the personal identifier is assigned, the feature vector being a multi-dimensional vector created from a first image including at least the first shopper by applying a deep-learning autoencoder;
assigning a common cart to the group of shoppers and associating the common cart identifier with all members of the group of shoppers;
tracking with the video surveillance system of the store, movement of each member of the group of shoppers throughout the store and items in the store selected for purchase by any of the shoppers in the group of shoppers, wherein the tracking includes sensing when the first or second shopper picks up a particular item in the store, wherein the sensing is made by sending a second image to the deep-learning autoencoder, retrieving a second feature vector from the second image, and comparing the second feature vector with the feature vector, and wherein the second image includes at least one of the first and second shopper;
specifying that a cost of the purchase of the selected items is to be split between the first shopper and the second shopper;
charging, through a frictionless check-out of the store, the first and second accounts for respective first and second portions of the cost of the purchase to be split between the first and second shoppers for the purchase of the selected items.

14. The system of claim 13, wherein tracking the items in the store comprises tracking items that are handled by any of the group of shoppers.

15. The system of claim 14, wherein tracking the items in the store comprises:
adding the particular item to a virtual shopping cart.

16. The system of claim 15, wherein tracking the items in the store further comprises:
sensing, from the at least one video stream, that a shopper of the group of shoppers has returned the particular item to the shelf or rack; and
removing the first item from the virtual shopping cart.

17. The system of claim 13, wherein receiving the selection of the account comprises:
receiving input of data corresponding to a credit card number from the shopper.

18. The system of claim 13, wherein identifying the shopper as being one of the group of shoppers comprises:
receiving at least one image from the at least one video stream, the at least one image including the check-in location of the store.

19. The system of claim 13, wherein identifying the shopper as being one of the group of shoppers comprises:

forming cropped images of bodies of the identified shoppers in the group;
sending the cropped images to the deep-learning autoencoder configured to execute on the processor; and
storing, on a storage device coupled to the processor, the multi-dimensional feature vector in a nearest-neighbors database.

\* \* \* \* \*